(Model.)
M. WANNER.
CENTRIFUGAL MACHINE.
No. 274,064. Patented Mar. 13, 1883.
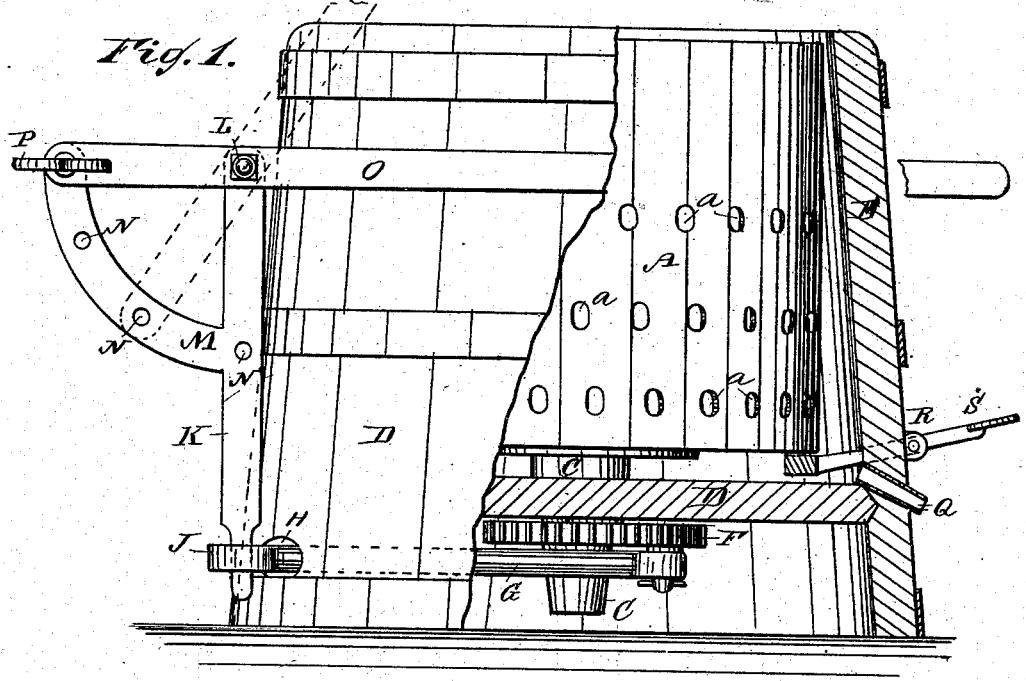
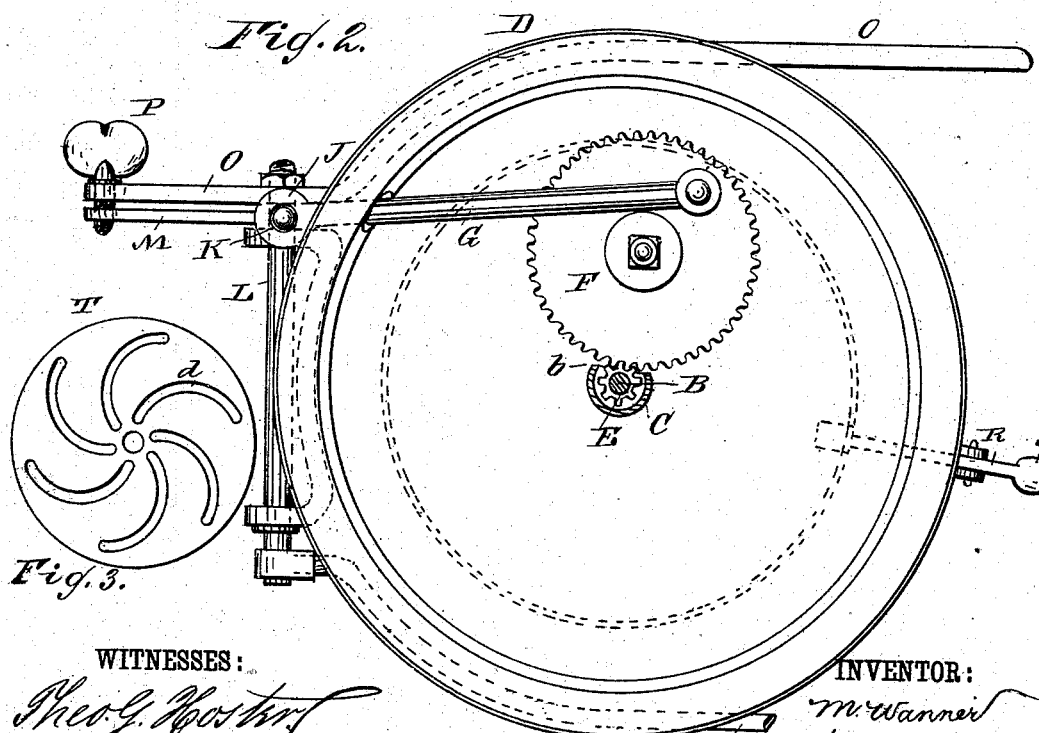
WITNESSES:
Theo. G. Hoster
C. Sedgwick
INVENTOR:
M. Wanner
BY Munn & Co.
ATTORNEYS.

UNITED STATES PATENT OFFICE.

MICHAEL WANNER, OF ST. LOUIS, MISSOURI.

CENTRIFUGAL MACHINE.

SPECIFICATION forming part of Letters Patent No. 274,064, dated March 13, 1883.

Application filed December 12, 1882. (Model.)

*To all whom it may concern:*

Be it known that I, MICHAEL WANNER, of St. Louis, Missouri, have invented a new and useful Improvement in Centrifugal Machines, of which the following is a full, clear, and exact description.

The object of my invention is to provide certain new and useful improvements in centrifugal machines used for drying clothes and for extracting juice or other liquids from different matters.

The invention consists of a centrifugal machine formed of a tub containing a perforated rotary vessel provided at its bottom with a spindle carrying a pinion engaging with a cog-wheel connected by a connecting-rod with an arm of a rocking shaft which is operated by a rocking handle-lever which can be held horizontally, vertically, or inclined, whereby by rocking the handle-lever the vessel in the tub will be rotated very rapidly.

The invention also consists in a brake and in a slotted cover for the rotary vessel, all as will be fully set forth and described hereinafter.

Reference is to be had to the accompanying drawings, forming part of this specification, in which similar letters of reference indicate corresponding parts in all the figures.

Figure 1 is a side view of my improved centrifugal machine, parts being broken out and others shown in section. Fig. 2 is a plan view of the under side of the same, and Fig. 3 is a plan view of the cover of the revolving vessel on a smaller scale.

A cylindrical vessel, A, open on top and provided on its sides to half the height with vertical slots $a$, or other apertures, is provided on its bottom with a downwardly-projecting spindle, B, which rests in a tubular socket, C, on the bottom of a vat or tub, D, containing the vessel A. The said socket C forms a step-bearing for the spindle B. A pinion, E, is mounted on the spindle B, and the teeth of the same project through a horizontal slot, $b$, in the socket C. A cog-wheel, F, pivoted in the bottom of the tub D, engages with the pinion E, and a connecting-rod, G, pivoted eccentrically on the under side of the wheel F, passes through a slot, H, in the tub-base, and is provided at its outer end with an eye, J, into which the end of a downwardly-projecting arm, K, of a horizontal shaft, L, projects, which shaft L is journaled on the side of the tub D. The arm K is provided with an upwardly-projecting quadrant-arm, M, having a series of apertures, N. A handle-lever, O, pivoted to the bearings of the shaft L, or to the tub D, has its lower or shorter end held on the curved arm M, or in the arm K, by means of a binding-screw, P, passed through one of the holes N, according to the desired position of the lever O. The tub D is provided with an outlet-pipe, Q. A brake-lever, R, pivoted in the tub, is provided at its outer end with a foot-rest, S, and its inner end extends under the bottom of the vessel A. The vessel A is provided with a cover, T, having a series of curved slots, $d$, toward the edges of which the cover is inclined downward, whereby a very great quantity of air can be drawn into the vessel A through the said cover. Thereby a greater pressure will be exerted on the material in the vessel A. If desired, an additional handle-lever O can be mounted on or attached to the other end of the shaft L.

The operation is as follows: By rocking the lever O the cog-wheel F will be rotated, and that in turn will rotate the pinion E and the vessel A with very great rapidity. The centrifugal force throws the liquid contained in the matter in the vessel A into the tub D, from which it flows through the outlet-pipe Q. If the speed of the vessel A is to be checked, or the same stopped altogether, the outer end of the brake-lever R is depressed by the foot, whereby the inner end of the same will be pressed against the bottom of the vessel A. The lever O can be held in a horizontal, inclined, or vertical position, as the operator may desire.

All the gearing of the machine is below the bottom of the tub, and is thus out of the way, and the articles in the vessel A are always kept clean and cannot come in contact with the greasy gearings, journals, &c.

The machine can also be used for working butter, and in that case the vessel A must be provided with one or more triangular or other projections on its inner surface.

I am aware that in centrifugal machines a perforated or slotted vessel has been made to revolve within an outer stationary vessel, and I therefore lay no claim, broadly, to such invention.

Having thus described my invention, I claim as new and desire to secure by Letters Patent—

1. In a centrifugal machine, the combination, with the tub D, of the perforated rotary vessel A, the spindle B, the socket C, having a slot, b, the cog-wheel F, and devices for rotating the same, substantially as herein shown and described, and for the purpose set forth.

2. In a centrifugal machine, the combination, with the tub D, provided with the socket C, having a slot, b, perforated rotary vessel A, having spindle B, carrying pinion E, cog-wheel F, and connecting-rod G, eccentrically pivoted thereto, of the arm K, having a curved arm, M, with apertures N, binding-screw P, shaft L, and lever O, substantially as described, and for the purpose set forth.

3. In a centrifugal machine, the combination, with the tub D and the rotary vessel A therein, of the cover T, provided with a series of curved slots having inclined edges, substantially as herein shown and described, and for the purpose set forth.

MICHAEL WANNER.

Witnesses:
CHAS. A. REICH,
CHAS. LOEPFE.